US010021178B2

(12) United States Patent
White et al.

(10) Patent No.: US 10,021,178 B2
(45) Date of Patent: *Jul. 10, 2018

(54) SYSTEM AND METHOD FOR MANAGING MEDIA CONTENT

(71) Applicant: AT&T INTELLECTUAL PROPERTY I, L.P., Atlanta, GA (US)

(72) Inventors: Scott White, Austin, TX (US); James Cansler, Rockwall, TX (US); Ian C. Schmehl, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/616,230

(22) Filed: Jun. 7, 2017

(65) Prior Publication Data
US 2017/0272514 A1  Sep. 21, 2017

(51) Int. Cl.
| G06F 15/16 | (2006.01) |
| H04L 29/08 | (2006.01) |
| H04N 7/173 | (2011.01) |
| H04N 21/258 | (2011.01) |
| H04N 21/414 | (2011.01) |

(Continued)

(52) U.S. Cl.
CPC .......... *H04L 67/1076* (2013.01); *H04L 65/60* (2013.01); *H04L 65/601* (2013.01); *H04L 67/06* (2013.01); *H04L 67/12* (2013.01); *H04L 67/24* (2013.01); *H04L 67/306* (2013.01); *H04N 7/17318* (2013.01); *H04N 21/25808* (2013.01); *H04N 21/41407* (2013.01);

(Continued)

(58) Field of Classification Search
CPC ..... H04L 67/1076; H04L 67/12; H04L 65/60; H04N 7/17318
USPC ........................................................ 709/203
See application file for complete search history.

(56) References Cited

U.S. PATENT DOCUMENTS

| 6,374,260 B1 | 4/2002 | Hoffert |
| 6,442,573 B1 | 8/2002 | Schiller et al. |

(Continued)

OTHER PUBLICATIONS

"Ceiva Official Site, The Original Digital Photo Frame", www.ceiva.com, Jan. 14, 2008, 2 pages.

(Continued)

*Primary Examiner* — Evans Desrosiers
(74) *Attorney, Agent, or Firm* — Guntin & Gust, PLC; Atanu Das

(57) ABSTRACT

A system that incorporates teachings of the present disclosure may include, for example, a media distribution system having a controller to identify a plurality of media presentation devices of a user of the media distribution system, identify one or more distribution preferences supplied by the user for distributing media content to the plurality of media presentation devices, receive media content from one of a plurality of media sources of the user, determine a media content type from the received media content, and distribute the received media content to one or more of the plurality of media presentation devices according to the one or more distribution preferences and the media content type. The one or more distribution preferences comprise in part media content distribution arrangements assigned by the user between the plurality of media sources of the user and the plurality of media presentation devices of the user. Other embodiments are disclosed.

20 Claims, 8 Drawing Sheets

(51) Int. Cl.
*H04N 21/485* (2011.01)
*H04N 21/643* (2011.01)
*H04L 29/06* (2006.01)
*G06F 15/177* (2006.01)

(52) U.S. Cl.
CPC ..... *H04N 21/41422* (2013.01); *H04N 21/485* (2013.01); *H04N 21/64322* (2013.01)

(56) References Cited

U.S. PATENT DOCUMENTS

| | | |
|---|---|---|
| 2002/0010759 A1 | 1/2002 | Hitson |
| 2002/0077984 A1 | 6/2002 | Ireton |
| 2002/0078056 A1 | 6/2002 | Hunt |
| 2003/0200336 A1 | 10/2003 | Pal et al. |
| 2006/0041632 A1 | 2/2006 | Shah et al. |
| 2006/0168250 A1* | 7/2006 | Feng ............... H04L 67/22 709/228 |
| 2006/0212346 A1 | 9/2006 | Brazell et al. |
| 2007/0011256 A1 | 1/2007 | Klein |
| 2007/0094366 A1 | 4/2007 | Ayoub |
| 2007/0180382 A1 | 8/2007 | Kortum et al. |
| 2007/0226365 A1* | 9/2007 | Hildreth ............. G11B 27/034 709/231 |
| 2007/0294177 A1 | 12/2007 | Volk et al. |
| 2008/0134260 A1 | 6/2008 | Glassman |

OTHER PUBLICATIONS

"The Voice-Activated Mobile Phone and Digital Music System for Your Car", www.syncmyride.com, Feb. 18, 2008, 2 pages.

\* cited by examiner

100

300

500

SYSTEM AND METHOD FOR MANAGING MEDIA CONTENT

CROSS-REFERENCE TO RELATED APPLICATIONS

This application is a continuation of and claims priority to U.S. patent application Ser. No. 14/964,983, filed Dec. 10, 2015, which is a continuation of and claims priority to U.S. patent application Ser. No. 14/528,191, filed Oct. 30, 2014 (now U.S. Pat. No. 9,241,023), which is a continuation of U.S. patent application Ser. No. 14/015,102 filed Aug. 30, 2013 (now U.S. Pat. No. 8,904,029), which is a continuation of and claims priority to U.S. patent application Ser. No. 12/033,082, filed Feb. 19, 2008 (now U.S. Pat. No. 8,543,721), the disclosures of which are incorporated herein by reference in their entireties.

FIELD OF THE DISCLOSURE

The present disclosure relates generally to media management techniques and more specifically to a system and method for managing media content.

BACKGROUND

A number of media formats are available for storing and distributing media content such as video, games, pictures, music, and so on. For example, movie content can be purchased or rented on a digital video disc commonly referred to as a DVD. Newer media formats are now offered with a higher quality of presentation such as high definition or HD DVDs, and Blu-ray DVDs. Music and games are commonly distributed in compact discs or CDs and DVDs at retail stores. Some consumers can choose to purchase media content over a communication medium (e.g., Internet Protocol TV, satellite TV or cable TV video on demand downloads to set-top boxes; iTunes™ to computers, Apple TV™ units and/or iPods™, etc.).

Media content such as described above can be recorded in some instances in computing devices such as laptops, set top boxes, portable media players, entertainment systems of automobiles, and so on.

DETAILED DESCRIPTION

One embodiment of the present disclosure entails a media distribution system having a controller to identify a plurality of media presentation devices of a user of the MDS, identify one or more distribution preferences supplied by the user for distributing media content to the plurality of media presentation devices, receive media content from one of a plurality of media sources of the user, determine a media content type from the received media content, and distribute the received media content to one or more of the plurality of media presentation devices according to the one or more distribution preferences and the media content type. The one or more distribution preferences comprise in part media content distribution arrangements assigned by the user between the plurality of media sources of the user and the plurality of media presentation devices of the user.

Another embodiment of the present disclosure entails a computer-readable storage medium having computer instructions for receiving media content from one of a plurality of media sources of a user, identifying a media content type from the received media content, and distributing the received media content to one or more of a plurality of media presentation devices of the user according to the identified media content type and one or more media content distribution arrangements assigned by the user between the plurality of media sources of the user and the plurality of media presentation devices of the user.

Yet another embodiment of the present disclosure entails a method involving distributing media content supplied by one of a plurality of media sources of a user to one or more of a plurality of media presentation devices of the user according to a media content type determined from the supplied media content and one or more media content distribution arrangements assigned by the user between the plurality of media sources of the user and the plurality of media presentation devices of the user.

Figure 1:
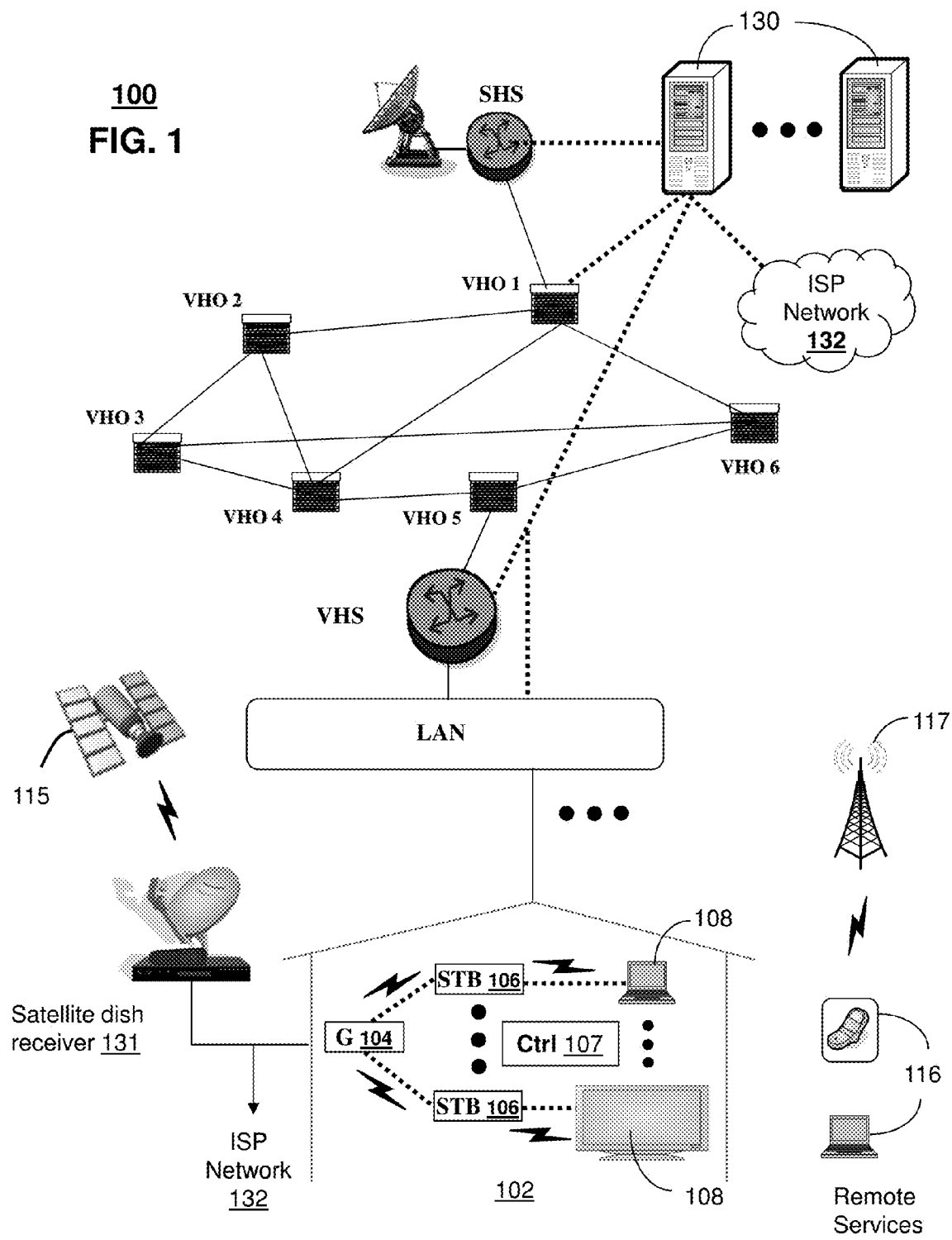
FIGS. 1-4 depict illustrative embodiments of communication systems that provide media services.

FIG. 1 depicts an exemplary embodiment of a first communication system 100 for delivering media content. The communication system 100 can represent an IPTV broadcast media system. In a typical IPTV infrastructure, there is at least one super head-end office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media presentation devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media presentation devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media presentation devices 108 or portable communication devices 116 by way of a wireless access point 117 providing Wireless Fidelity or WiFi services, or cellular communication services (e.g., GSM, CDMA, UMTS, WiMAX, etc.).

Another distinct portion of the one or more computing devices 130 can be utilized as a media distribution system (MDS) 130 for collecting media content from a number of media sources, and for distributing said media content according to media content types and distribution preferences. Media content can represent audio content (e.g., MP3 music files, recordings made by a user with any number of audio recording devices), visual content (e.g., pictures, video, literature with text and graphics, news reports, etc.), or combinations thereof.

Media sources can represent any number of content sources such as Internet media content sources (e.g., VoD catalogs, music and movies from iTunes™, etc.), a portable media player (e.g., iPod™), still image recorders such as standalone digital cameras or digital cameras embedded in cell phones, moving image recorders such as standalone digital camcorders or video recorders in a cell phone, and/or audio recorders which can record radio programs, ambient sound, or otherwise. The above media sources can be communicatively coupled to the MDS 130 by a tethered wireline connection (e.g., broadband xDSL or cable, USB connection, etc.), or by way of a wireless interface such as wireless fidelity (WiFi), or common cellular access technologies (e.g., CDMA, GSM, UMTS, etc.).

The media presentation devices are computing devices capable of presenting media content redistributed by the MDS 130. Media presentation devices can be represented for example by a computing device (e.g., a laptop computer), a portable media player (e.g., iPod™), an entertainment system of an automobile coupled to for example a telemetry system of the automobile, a set top box such as the ones illustrated in FIG. 1. Other media presentation devices suitable to the present disclosure can also be considered. Media presentation devices can receive media content from the MDS 130 over common tethered interfaces (e.g., broadband DSL or cable, USB connection, etc.), or by a wireless medium such as WiFi, or cellular.

In another illustrative embodiment, the MDS 130 can represent a computing device located in building 102. The computing device can represent a laptop computer, a desktop computer, a set top box, or another suitable computing device that can exchange media content between media sources and media presentation devices.

From the foregoing embodiments, it should be apparent to one of ordinary skill in the art that the MDS 130 can reside in any location of the media communication system 100. Additionally, the MDS 130 can operate as a distributed or centralized computing device. For example, large storage devices of the MDS 130 can be made accessible by way of the media communication system 100 and located outside of the premises of a subscriber, while the computing portion of the MDS can reside in building 102.

It should be further understood that the terms media sources and media presentation devices can be interchangeable. That is, in some instances a media presentation device that has recently recorded new media content can serve as a media source to the MDS 130, while a media source can serve as a media presentation device when new media content is available from another device. Accordingly, any computing device that can receive and/or present media content can serve as either a media source supplying media content or a media presentation device capable of presenting media content.

In yet another illustrative embodiment, a satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
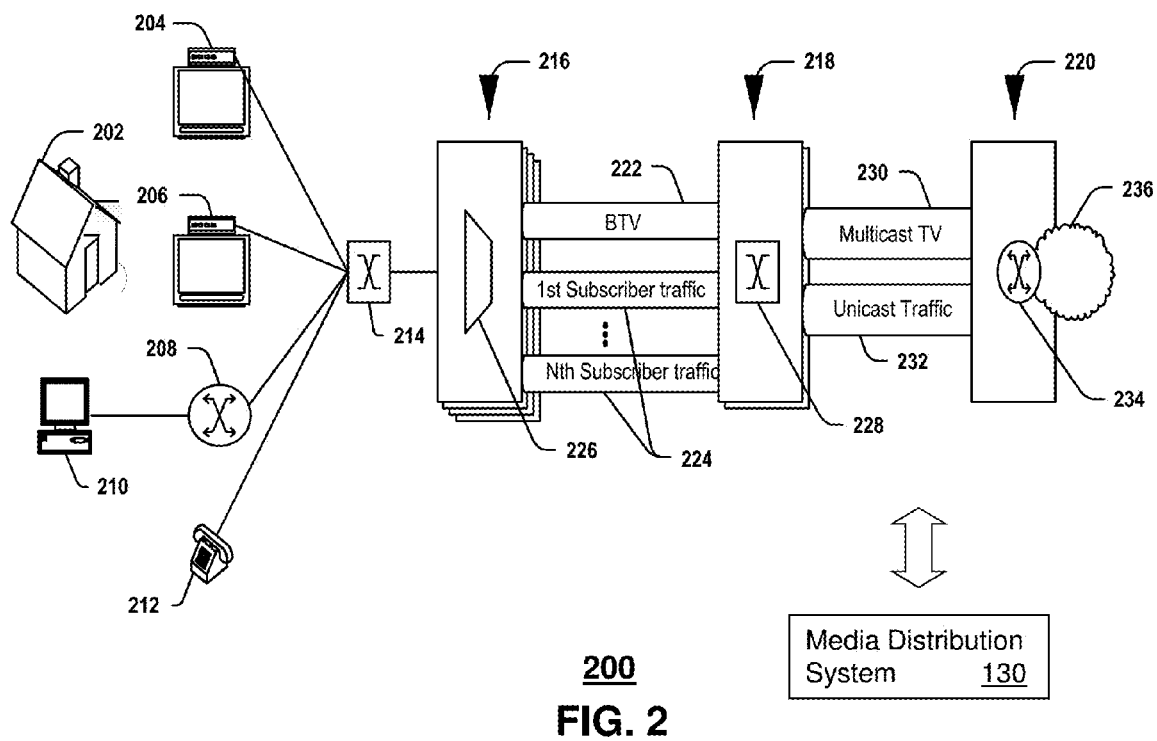

FIG. 2 depicts an exemplary embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/ router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The MDS 130 of FIG. 1 can be operably coupled to the second communication system 200 for purposes of collecting and distributing media content by way of the second communication system.

Figure 3:
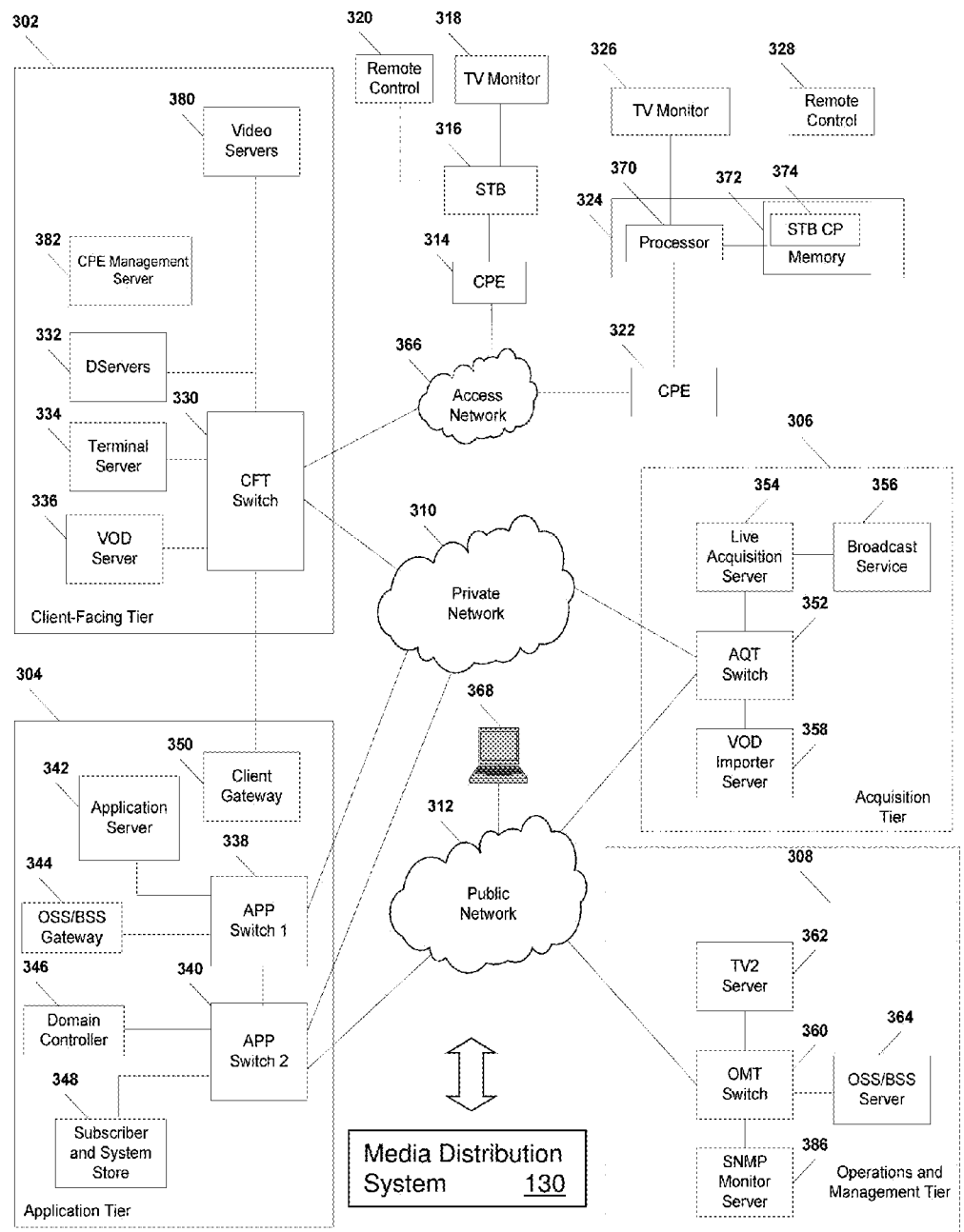

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 322.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a video-on-demand (VOD) server 336 that stores or provides VOD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VOD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VOD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VOD server 336 at the client-facing tier 302 via the private network 310. Additionally, at the acquisition tier 306, the video-on-demand (VOD) importer server 358 can receive content from one or more VOD sources outside the IPTV system 300, such as movie studios and programmers of non-live content. The VOD importer server 358 can transmit the VOD content to the AQT switch 352, and the AQT switch 352, in turn, can communicate the material to the CFT switch 330 via the private network 310. The VOD content can be stored at one or more servers, such as the VOD server 336.

When users issue requests for VOD content via the set-top box devices 316, 324, the requests can be transmitted over the access network 366 to the VOD server 336, via the CFT switch 330. Upon receiving such requests, the VOD server 336 can retrieve the requested VOD content and transmit the content to the set-top box devices 316, 324 across the access network 366, via the CFT switch 330. The set-top box devices 316, 324 can transmit the VOD content to the television monitors 318, 326. In an illustrative embodiment, video or audio portions of VOD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The MDS 130 of FIGS. 1-2 can be operably coupled to the third communication system 300 for purposes of collecting and distributing media content by way of the third communication system.

It should be apparent to one of ordinary skill in the art from the foregoing media communication system embodiments that other suitable media communication systems for distributing broadcast media content as well as peer-to-peer exchange of content can be applied to the present disclosure.

Figure 4:
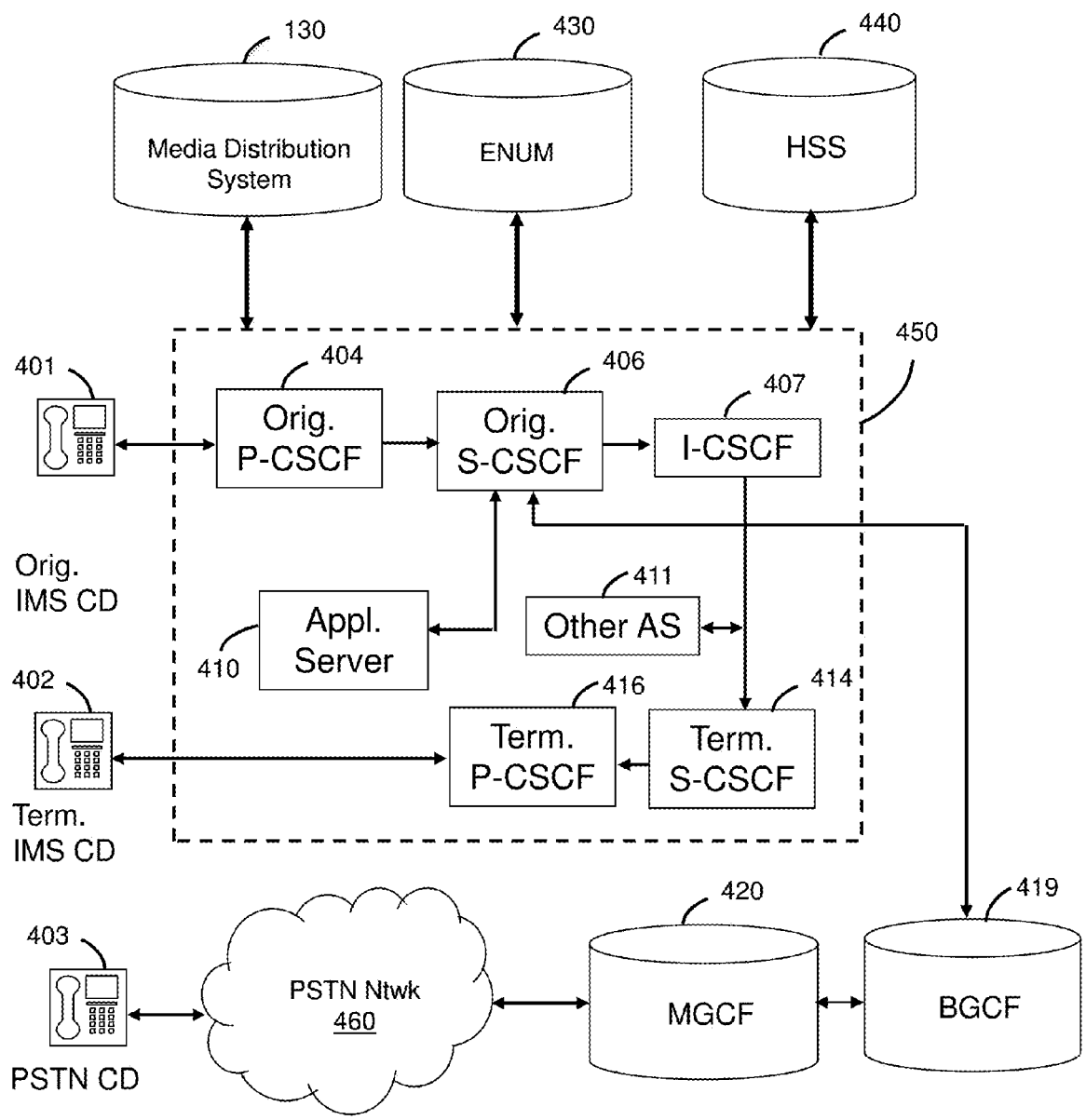

FIG. 4 depicts an exemplary embodiment of a communication system 400 employing a IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) support by the HSS 440. To accomplish a communication session between CDs, an originating IMS CD 401 can submit a SIP INVITE message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the MDS 130 previously discussed for FIG. 1. In this representative embodiment, the MDS 130 can be accessed over a PSTN or VoIP channel of communication system 400 by common techniques such as described above.

Figure 5:
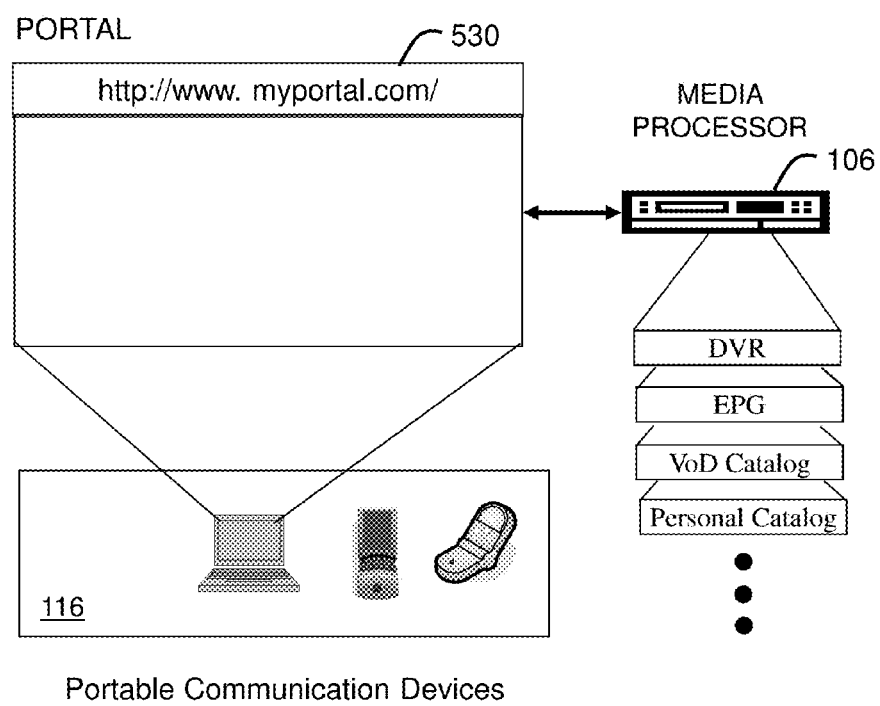
FIG. 5 depicts an illustrative embodiment of a portal interacting with at least one among the communication systems of FIGS. 1-4.

FIG. 5 depicts an exemplary embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VOD catalog, a personal catalog stored in the STB (e.g., personal videos, pictures, audio recordings, etc.), and so on. The portal 530 can also be used by the subscriber to provision the MDS 130 with media content distribution preferences.

Figure 6:
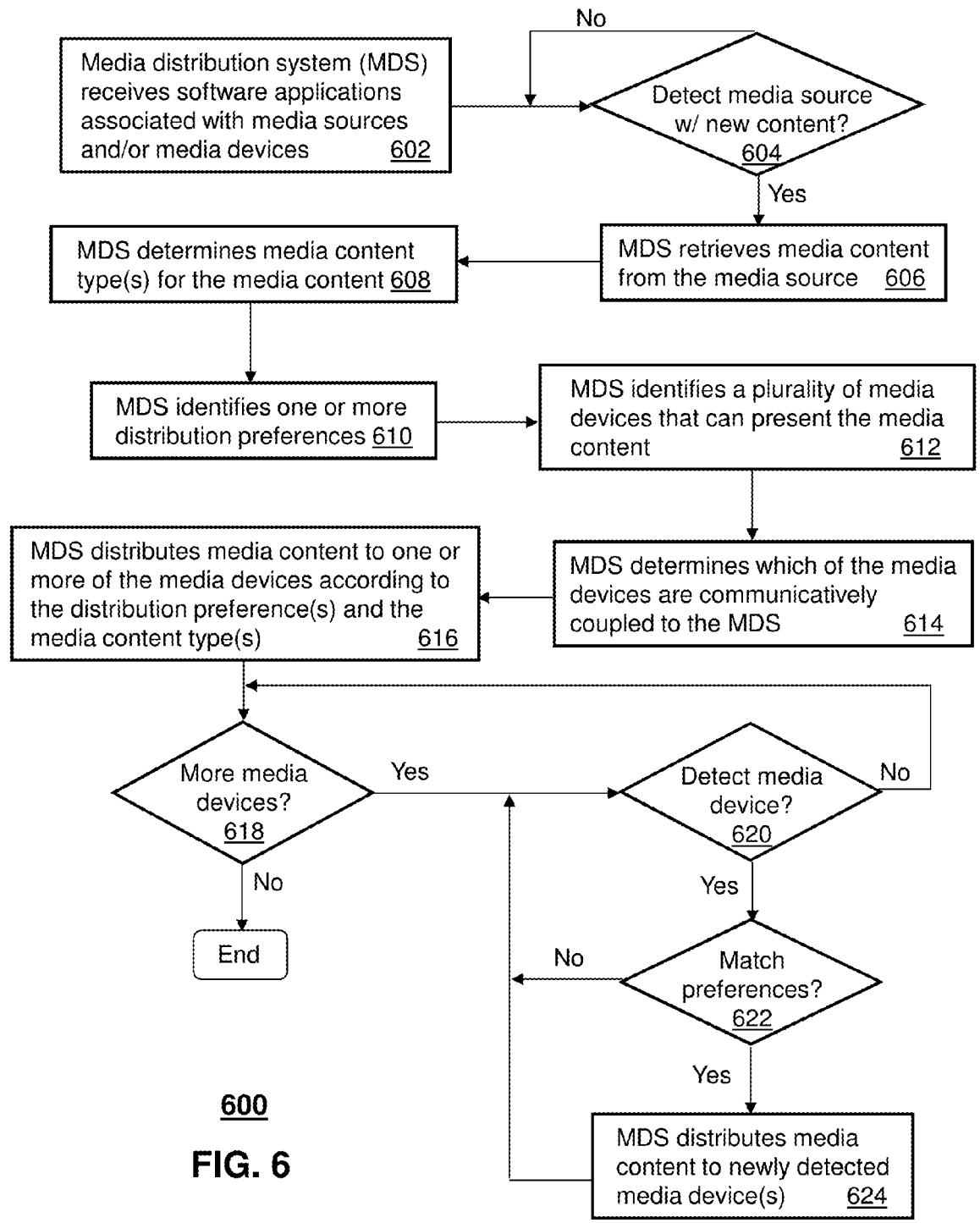
FIG. 6 depicts an illustrative method operating in portions of the communication systems of FIGS. 1-4.
Figure 7:
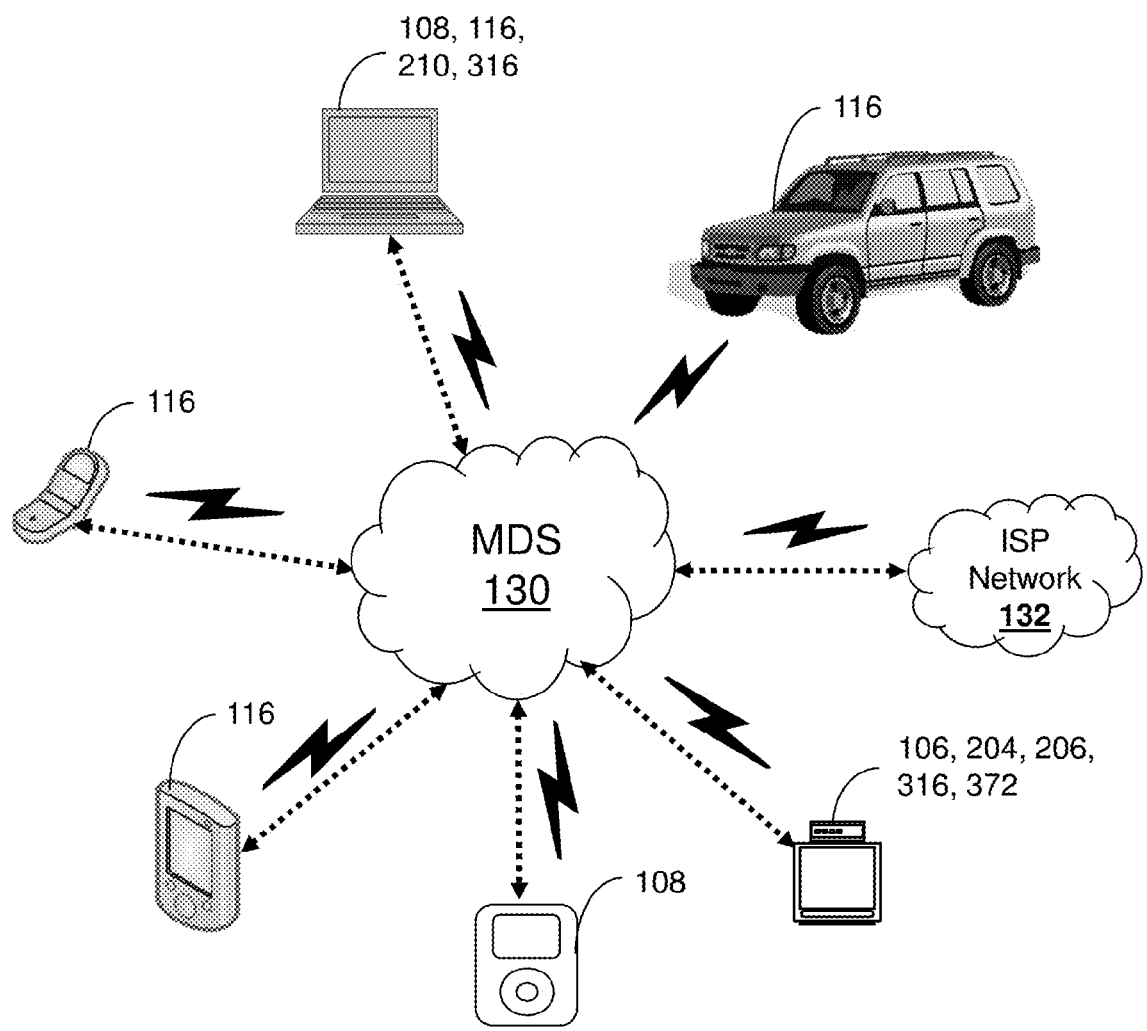
FIG. 7 depicts an illustrative embodiment of media presentation devices and media sources coupled to a media distribution system by a wireline or wireless interface.

FIG. 6 depicts an exemplary method 600 operating in portions of communication systems 100-400. Method 600 illustrates one of several embodiments for collecting media content from media sources and distributing said media content to some or all media presentation devices accessible by the MDS 130. FIG. 7 provides an illustration of media presentation devices and media sources coupled to the MDS 130 by a wireline or wireless interface. As noted earlier, the MDS 130 can reside in the premises of a subscriber, remotely in any of the media communication systems of FIGS. 1-4, or decentralized with portions of the MDS distributed in disparate locations. In the case where the MDS 130 is remotely situated from a user, the user can access the MDS 130 by way of portal 530.

With these principles in mind, method 600 begins with step 602 in which the MDS 130 receives software applications associated with media sources and/or media presentation devices. The software applications can represent common libraries and/or plug-ins to facilitate at the MDS 130 receiving and processing media content from media sources as well as for distributing media content to the media presentation devices. The software applications can also provide a means for the MDS 130 to detect the entry of a media source or media presentation device in a network from which the MDS is operating.

Once these software applications have been installed in the MDS 130, the MDS can proceed to step 604 where it monitors for the entry of a media source in its network with new media content not previously available to the media presentation devices. If a media source is detected, but the MDS 130 has in its data banks a copy of the media content recorded in the media source or is aware that the media content has already been distributed to the media devices, the MDS ignores the detection and continues to search for media sources with new media content. Once a media source with new media content is detected by the MDS 130, the MDS proceeds to step 606 where it retrieves the new media content (using the software applications of step 602 to facilitate the retrieval) and determines in step 608 one or more media content types.

A media content type can represent an audio content type (e.g., MP3, WAV, etc.), a visual content type (e.g., MP4, JPEG, GIF, etc.), or combinations thereof. In step 610, the MDS 130 identifies one or more distribution preferences established by a subscriber. The distribution preferences can represent user-defined macros for directing a distribution of media content according to media content distribution arrangements assigned by the user between a plurality of media sources of the user and the plurality of media presentation devices of the user.

For example, suppose a subscriber enters a network from which the MDS 130 is operating with a cell phone that has a digital camera that can capture still pictures as well as videos in JPEG and MP4 formats respectfully. Also assume the subscriber has a media player built into the phone such as is available with iPhones™ with a library of songs (MP3 files) and videos (MP4 files) which the user has purchased from iTunes™. In this hypothetical example the cell phone can serve as a media source detected in step 604 with new media content.

Further suppose that the subscriber has an STB in his or her residence such as the ones illustrated in FIGS. 1-3 which can present still pictures, videos, and music in the above-mentioned formats. Also, assume that the subscriber has an automobile entertainment system that can play MP3 music files and can wirelessly communicate with the MDS 130 over a cellular network such as 117 of FIG. 1.

With the above devices in mind, the subscriber can provision the MDS 130 from a common interface such as a portal 530 with distribution preferences to address how the media content of the above illustration is to be distributed. The portal 530 can present the subscriber a common graphical user interface (GUI) to enter and define macros for assigning a distribution arrangement between the media sources and the media presentation devices of the subscriber. Referring back to the illustration, the subscriber can specify that all new media files in the cellular phone (MP3, MP4, and JPEG files) are to be distributed to the STB, while only MP3 files are to be distributed to the entertainment system of the automobile. If the automobile has a video system such as a DVD player which can present MP4 files, the subscriber can also define in the distribution preferences that MP4 files are to be distributed to the entertainment system of the automobile.

By way of the GUI interface of the portal 530 the subscriber can also identify a number of possible media sources and media presentation devices which the MDS 130 can communicate with. The descriptions of the media sources and media presentation devices can include among other things one or more communication identifiers (e.g., IP address, SIP URI, URL, telephone number, etc.), model numbers, computing resource capabilities, and so on.

Under circumstances where media sources and media presentation devices are supplied to the subscriber by a service provider of one of the media communication systems of FIGS. 1-4, the portal 530, acting as a subsystem of the media communication system, can automatically populate provisioning fields describing said media sources and media presentation devices by retrieving information about these devices from a subscriber database of the media communication system. In situations, where some of the media sources and/or media presentation devices are exclusively owned by the subscriber (e.g., an iPod, camera, etc.) and not managed by the service provider of the media communication system, the subscriber will have to populate provisioning fields in the portal 530 for each identified media source and/or media presentation device.

Once the media sources and media presentation devices have been identified and described, the portal 530 can inform the MDS 130 of these descriptions which in turn can prompt the MDS to request, as previously discussed in step 602, software applications and/or plug-ins from websites that support these devices.

After the MDS 130 has identified the distribution preferences in step 610, the MDS can identify in step 612 the media presentation devices capable of receiving the new media content detected in step 604, and determine which of the media presentation devices are communicatively coupled to the MDS by utilizing the communication identifiers (discussed earlier) to attempt establishing communications with the media presentation devices. Once the MDS 130 identifies which of the media presentation devices is available to receive media content, the MDS proceeds to step 616 where it distributed all or portions of the media content to the media presentation devices according to the distribution preferences and the media content types determined in step 608.

In the illustrative example previously discussed, the MDS 130 would distribute all media files to the STB, and only the MP3 and MP4 files to the automobile entertainment system as directed by the distribution preferences established by the subscriber by way of the portal 530. The distribution of media content to the STB as previously noted can occur over a wireline interface (e.g., Ethernet) or WiFi, while the distribution to the automobile entertainment system can occur over a cellular interface.

Suppose however that the automobile is turned off at the time that the MDS 130 checked the availability of entertainment system in step 614, and said system did not respond to the MDS's communication prompt. Under these circumstances, step 616 would apply only to the STB. To address this situation, the MDS 130 can be directed to step 618 to determine if other media presentation devices have been targeted to receive portions of the media content, but were not detected in step 614. If all targeted media presentation devices have been found, and have successfully received the media content, then method 600 ends and is repeated for subsequently detected media sources with new media content.

If a targeted media presentation device was not available as in the present illustration, the MDS 130 proceeds to step 620 to determine if the media presentation device has subsequently become communicatively available. If a device is detected, the MDS 130 can proceed to step 622 to determine if it is one of the targeted media presentation devices of step 616. If it is not, the MDS 130 can return to step 620 and continue the monitoring process. If in step 622 the MDS 130 determines that the media presentation device detected in step 620 is a targeted media presentation device, the MDS can proceed to step 624 to distribute media content according to the distribution preferences and media content types as previously discussed in step 616. After step 624, the MDS 130 can return to steps 620 and 618 to repeat the monitoring process until all targeted media presentation devices have been found. Steps 618-624 can operate as a background process of the MDS 130.

Upon reviewing the aforementioned embodiments, it would be evident to an artisan with ordinary skill in the art that said embodiments can be modified, reduced, or enhanced without departing from the scope and spirit of the claims described below. For example, method 600 can be adapted so that the monitoring process of steps 618-620 is performed proactively. For example, the MDS 130 can be directed to submit one or more prompt messages (e.g., SMS messages) to the entertainment system of the automobile by way of for example its telemetry system to inform it that new media content is available from the MDS. Once the subscriber has turned on the automobile, the entertainment system can receive the queued SMS message from the cellular system, thereby prompting it to submit a response message (e.g., another SMS) to the MDS 130 indicating it is ready to receive the media content. At that point, the MDS 130 can proceed to step 624 to transmit the media content according to the distribution preferences and media content types detected in step 608.

In yet another illustrative embodiment, method 600 can be adapted so that media content is categorized by the MDS 130 before its transmission to the targeted media presentation devices. Returning to the previously mentioned illustration, the cellular phone serving as a media source can include MP4 files which were generated by the subscriber using the digital camera of the cellular phone. These MP4 files can be distinguished from commercial MP4 files delivered by an Internet content source such as iTunes™. The MDS 130 can be adapted to create metadata (if the metadata is not already supplied by the cellular phone) to describe these differences, and attach the metadata to the media files before it is transmitted to the targeted media presentation devices. The metadata can also indicate the source of the media content (e.g., subscriber's cell phone). The media presentation devices in turn can use this information to categorize the received media content so the subscriber can readily distinguish the source of the media content, separate commercial content from personal recordings.

In another illustrative embodiment, method 600 can be adapted to define more complex distribution preferences. For instance, if the media content includes metadata with tags and/or description of the media content, the subscriber can define macros for distributing content between media players. For instance, the subscriber can define macros so that media content of only certain music performers is to be distributed to the automobile of the subscriber.

In yet another illustrative embodiment, method 600 can be adapted so that distribution preferences can be defined on a per user basis. In this embodiment, media content can be distributed by the MDS 130 among media devices of multiple subscribers according to the distribution preferences of each corresponding subscriber.

Other suitable modifications that can be applied to the present disclosure without departing from the scope of the claims below. Accordingly, the reader is directed to the claims section for a fuller understanding of the breadth and scope of the present disclosure.

Figure 8:
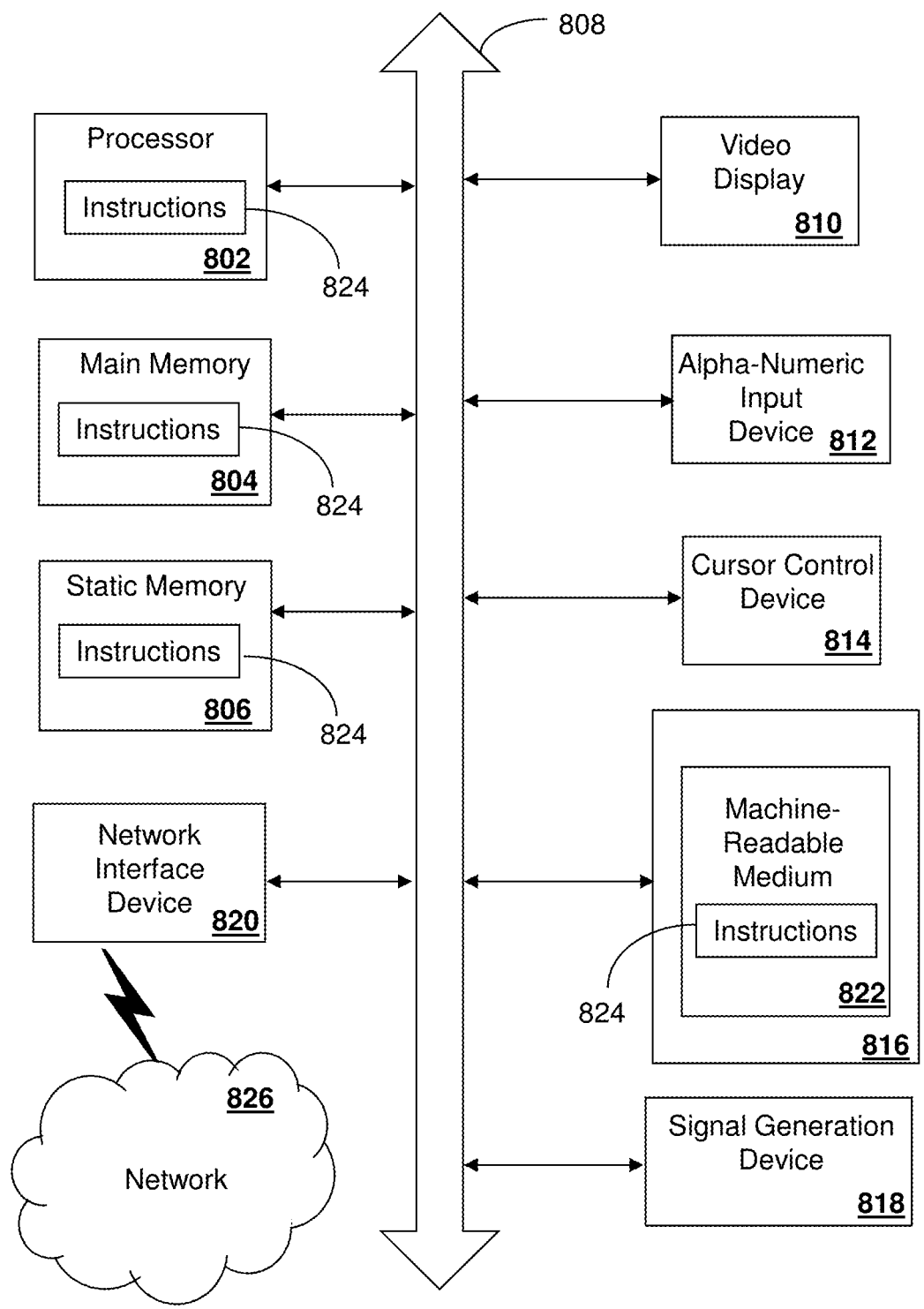
FIG. 8 is a diagrammatic representation of a machine in the form of a computer system within which a set of instructions, when executed, may cause the machine to perform any one or more of the methodologies discussed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, comprising:
obtaining a plurality of media content, wherein the plurality of media content comprises video content and audio content;
identifying a distribution preference for the plurality of media content according to user-generated input, wherein the distribution preference indicates to send the video content to a set-top box, and wherein the distribution preference indicates to send the audio content to an automobile entertainment system;
monitoring a plurality of media devices over a group of time intervals, wherein the plurality of media devices comprise the set-top box and the automobile entertainment system;
determining a change in availability of at least one of the plurality of media devices over the group of time intervals, wherein the determining the change in availability of the at least one of the plurality of media devices comprises determining that a first portion of the plurality of media devices are unavailable to receive the media content and determining that a second portion of the plurality of media devices are available to receive the media content; and
distributing the media content to the at least one of the plurality of media devices according to the change in availability and the distribution preference, wherein the distributing of the media content comprises distributing the video content to the set-top box and the audio content to the automobile entertainment system.

2. The device of claim 1, wherein the device comprises a media source device entering a communication network, and wherein the device comprises a mobile communication device.

3. The device of claim 1, wherein the operations further comprise:
identifying a media content type for the media content; and
determining the plurality of media devices are capable of receiving the media content according to the media content type.

4. The device of claim 1, wherein the determining the change in availability of the at least one of the plurality of media devices comprises determining that a portion of the plurality of media devices are unavailable to receive the media content.

5. The device of claim 4, wherein the determining the change in availability of the at least one of the plurality of media devices comprises determining the portion of the plurality of media devices are available to receive to media content.

6. The device of claim 1, wherein the operations comprise receiving the user-generated input, wherein the user-generated input indicates a group of target media devices from the plurality of media devices.

7. The device of claim 6, wherein the operations comprise receiving a software application associated with a media source device, wherein distributing the media content comprises distributing the media content according to the user-generated input using the software application.

8. A non-transitory machine-readable storage medium, comprising executable instructions that, when executed by a processing system including a processor, facilitate performance of operations, comprising:
obtaining a plurality of media content, wherein the plurality of media content comprises video content and audio content;
identifying a distribution preference for the plurality of media content according user-generated input, wherein the distribution preference indicates to send the video content to a set-top box, and wherein the distribution preference indicates to send the audio content to an automobile entertainment system;
monitoring a plurality of media devices over a group of time intervals, wherein the plurality of media devices comprise the set-top box and the automobile entertainment system;
determining a change in availability of at least one of the plurality of media devices over the group of time intervals, wherein the determining the change in availability of the at least one of the plurality of media devices comprises determining that a first portion of the plurality of media devices are unavailable to receive the media content and determining that a second portion of the plurality of media devices are available to receive the media content; and
distributing the media content to the at least one of the plurality of media devices according to the change in availability and the distribution preference, wherein the distributing of the media content comprises distributing the video content to the set-top box and the audio content to the automobile entertainment system.

9. The non-transitory machine-readable storage medium of claim 8, wherein the operations further comprise:
identifying a media content type for the media content; and
determining the plurality of media devices are capable of receiving the media content according to the media content type.

10. The non-transitory machine-readable storage medium of claim 8, wherein the processing system comprises a media source device entering a communication network.

11. The non-transitory machine-readable storage medium of claim 8, wherein the processing system comprises a mobile communication device.

12. The non-transitory machine-readable storage medium of claim 8, wherein the operations comprise receiving the user-generated input, wherein the user-generated input indicates a group of target media devices from the plurality of media devices.

13. The non-transitory machine-readable storage medium of claim 12, wherein the operations comprise receiving a software application associated with a media source device, wherein distributing the media content comprises distributing the media content according to the user-generated input using the software application.

14. A method, comprising:
- obtaining, by a processing system including a processor, a plurality of media content, wherein the plurality of media content comprises video content and audio content;
- identifying, by the processing system, a distribution preference for the plurality of media content according to user-generated input, wherein the distribution preference indicates to send the video content to a set-top box, and wherein the distribution preference indicates to send the audio content to an automobile entertainment system;
- monitoring, by the processing system, a plurality of media devices over a group of time intervals, wherein the plurality of media devices comprise the set-top box and the automobile entertainment system;
- identifying, by the processing system, a media content type for the media content;
- determining, by the processing system, the plurality of media devices are capable of receiving the media content according to the media content type;
- determining, by the processing system, a change in availability of the at least one of the plurality of media devices over the group of time intervals, wherein the determining, by the processing system, the change in availability of the at least one of the plurality of media devices comprises determining, by the processing system, that a first portion of the plurality of media devices are unavailable to receive the media content and determining that a second portion of the plurality of media devices are available to receive the media content; and
- distributing, by the processing system, the media content to the at least one of the plurality of media devices according to the change in availability and the distribution preference, wherein the distributing of the media content comprises distributing the video content to the set-top box and the audio content to the automobile entertainment system.

15. The method of claim 14, wherein the processing system comprises a media source device entering a communication network.

16. The method of claim 15, wherein the processing system comprises a mobile communication device.

17. The method of claim 14, wherein the determining the change in availability of the at least one of the plurality of media devices comprises determining, by the processing system, that a portion of the plurality of media devices are unavailable to receive the media content.

18. The method of claim 17, wherein the determining the change in availability of the at least one of the plurality of media devices comprises determining, by the processing system, the portion of the plurality of media devices are available to receive to media content.

19. The method of claim 14, comprising receiving, by the processing system, the user-generated input, wherein the user-generated input indicates a group of target media devices from the plurality of media devices.

20. The method of claim 19, comprising receiving, by the processing system, a software application associated with a media source device, wherein distributing the media content comprises distributing, by the processing system, the media content according to the user-generated input using the software application.

* * * * *

UNITED STATES PATENT AND TRADEMARK OFFICE
CERTIFICATE OF CORRECTION

PATENT NO.       : 10,021,178 B2
APPLICATION NO.  : 15/616230
DATED            : July 10, 2018
INVENTOR(S)      : Scott White et al.

Page 1 of 1

It is certified that error appears in the above-identified patent and that said Letters Patent is hereby corrected as shown below:

On the Title Page

In Column 1, below "Sep. 21, 2017" insert -- Related U.S. Application Data Continuation of application No. 14/964,983 filed on Dec. 10, 2015, which is a continuation of application No. 14/528,191, filed on Oct. 30, 2014, now Pat. No. 9,241,023, which is a continuation of application No. 14/015,102, filed on Aug. 30, 2013, now Pat. No. 8,904,029, which is a continuation of application No. 12/033,082, filed on Feb. 19, 2008, now Pat. No. 8,543,721 --.

In the Claims

In Column 18, Line 19, Claim 8, after "according" insert -- to --.

Signed and Sealed this
Twenty-ninth Day of January, 2019

Andrei Iancu
*Director of the United States Patent and Trademark Office*